Figure 1:
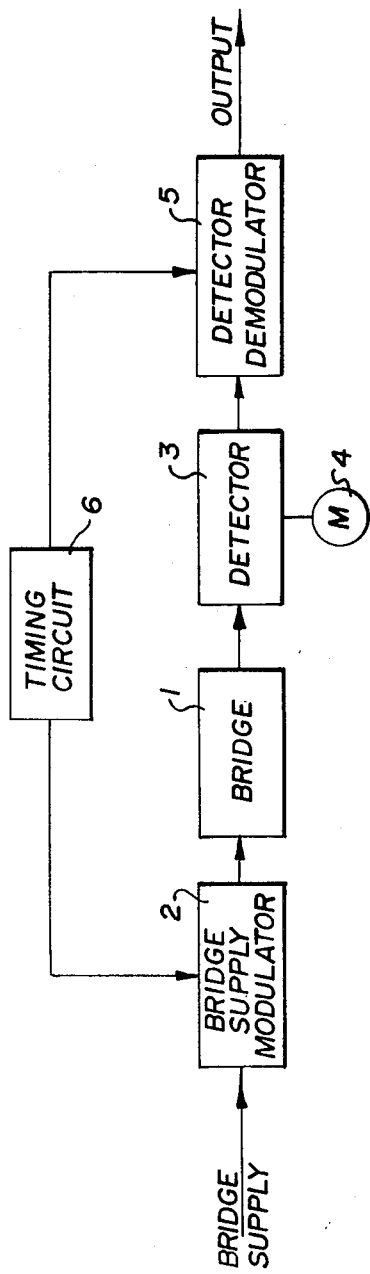

United States Patent [19]

Kusters et al.

[11] 3,714,567

[45] Jan. 30, 1973

[54] DETECTOR-DEMODULATOR FOR MODULATED (REVERSED) AC AND DC SIGNALS

[75] Inventors: Norbert L. Kusters; Malcolm P. MacMartin, both of Ottawa, Ontario, Canada

[73] Assignee: Canadian Patents and Development Limited, Ottawa, Ontario, Canada

[22] Filed: May 12, 1971

[21] Appl. No.: 142,544

[52] U.S. Cl. ................................. 324/111, 324/118
[51] Int. Cl. .............................................. G01r 19/00
[58] Field of Search........324/118, 101, 119, 140, 99, 324/111

[56] References Cited

UNITED STATES PATENTS 3,441,851    4/1969    Savage..............................324/118 X Primary Examiner—Alfred E. Smith
Attorney—James R. Hughes

[57] ABSTRACT

A detector-demodulator for current and voltage measuring devices having a modulated (reversing) output wherein the detector-demodulator incorporates time constant elements after the demodulation stage that permit the use of a fast acting detector and yet achieves a narrow bandwidth performance. The apparatus comprises first and second switches connected in parallel to the output of the measuring device, voltage storage means incorporating long time constant elements connected to each of the outputs of said switches, switch operating means for opening and closing said switches in a predetermined timing sequence, and means attached to the output of the voltage storage means for measuring the difference in the voltage levels stored in the voltage storage means. The timing sequence may be controlled manually or automatically and would be arranged such that the modulated output would be sampled only during a relatively steady-state period so that switching transients would not appear in the output.

8 Claims, 7 Drawing Figures

DETECTOR-DEMODULATOR FOR MODULATED (REVERSED) AC AND DC SIGNALS

This invention relates to a detector-demodulator for DC and AC measurements and particularly for a detector-demodulator for use with precise measuring apparatus such as those incorporating reversing bridges and null detectors.

Electrical measuring bridges and associated null detectors are often subjected to spurious signals which can introduce significant errors in a measurement. When the frequency of these spurious signals is different from the operating frequency of the bridge, their effect on the measurement can be nearly eliminated by reducing the bandwidth of the detector. For DC measurements, galvanometers are commonly used and bandwidth reduction is achieved by increasing the time constant of the galvanometer. For AC measurements, tuned detectors are often used. Recently the phase-sensitivity detectors have found wide acceptance and application because no tuning is required to achieve a narrow bandwidth. However, when the frequency of the spurious signals is the same as the operating frequency, their effect on the measurements cannot be eliminated by reducing the bandwidth of the detector.

A most serious problem involved in DC measurements is that of thermal EMF's. Constant thermal EMF's constitute a spurious signal of the same frequency as the operating frequency of the bridge and can be eliminated only by reversal (modulation) of the bridge supply. Varying thermal EMF's can be eliminated only if the reversal rate is rapid. Because a long time constant galvanometer cannot be used with a rapidly reversing measuring apparatus and achieve accurate readings, these two requirements are incompatible and up to the present time there has been no satisfactory solution to the problem.

It is an object of the invention to provide a detector-demodulator for the modulated (reversed) output of a current or voltage measuring device such as a direct current or alternating current bridge.

It is another object of the invention to provide a detector-demodulator for use with electrical measuring apparatus involving a reversing bridge and a null detector that permits the use of a short time constant null detector and measuring apparatus so that it may be reversed rapidly and yet achieves a narrow bandwidth detector to reduce noise.

These and other objects of the invention are achieved by a detector-demodulator for current and voltage measuring devices having a modulated (reversing) output wherein the detector-demodulator incorporates time constant elements after the demodulation stage that permit the use of a fast acting detector and yet achieves a narrow bandwidth performance. The apparatus comprises first and second switches connected in parallel to the output of the measuring device, voltage storage means incorporating long time constant elements connected to each of the outputs of said switches, switch operating means for opening and closing said switches in a predetermined timing sequence, and means attached to the output of the voltage storage means for measuring the difference in the voltage levels stored in the voltage storage means. The timing sequence may be controlled manually or automatically and would be arranged such that the modulated output would be sampled only during a relatively steady-state period so that switching transients would not appear in the output.

Figure 2:
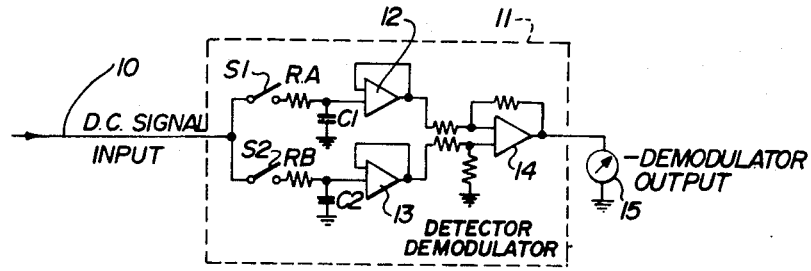
Figure 3:
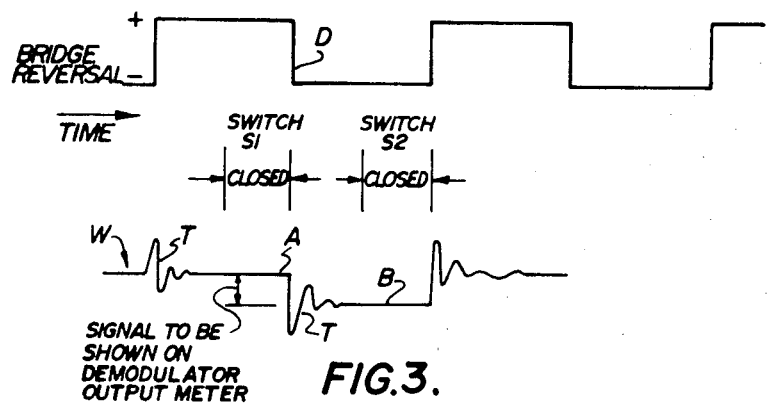
Figure 4:
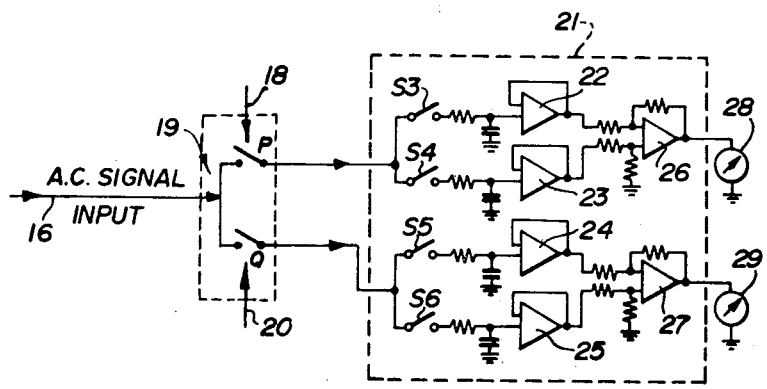
Figure 5:
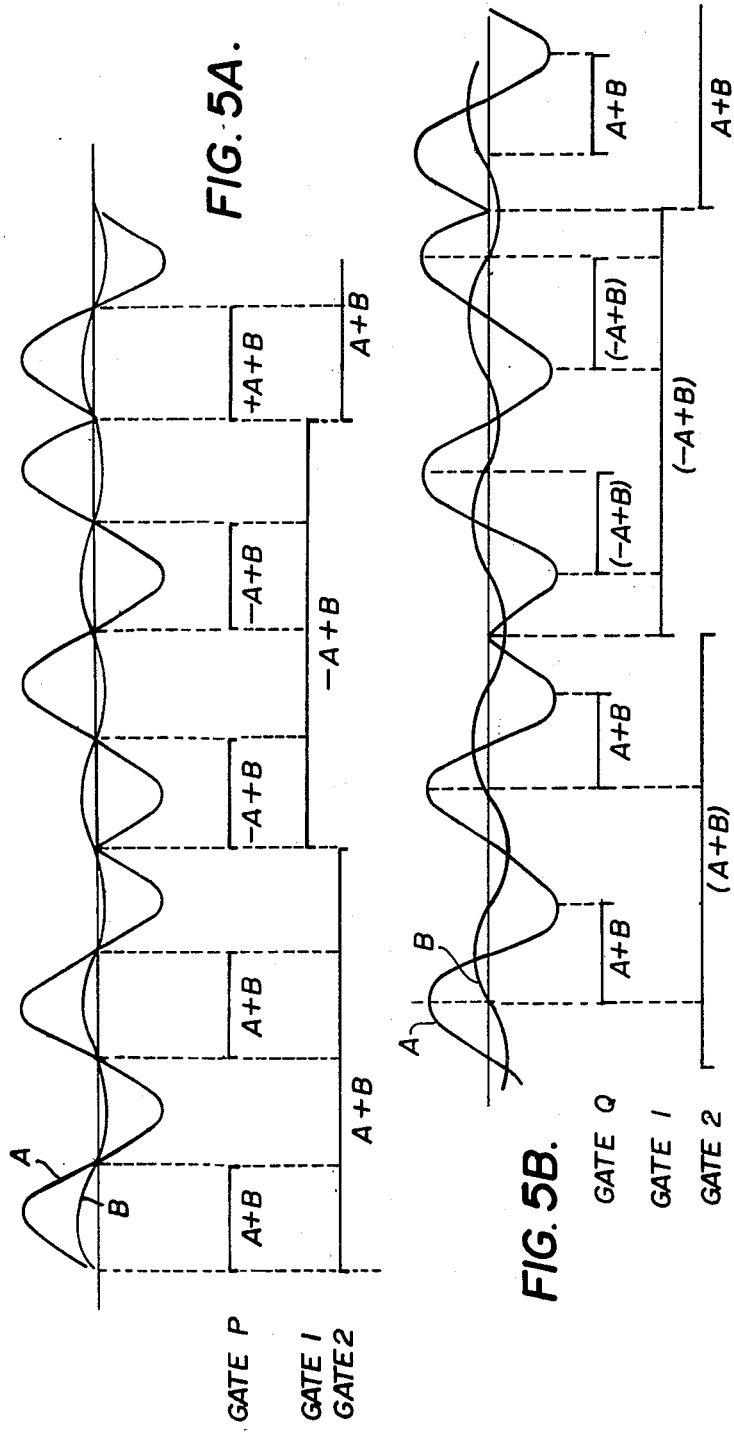
Figure 6:
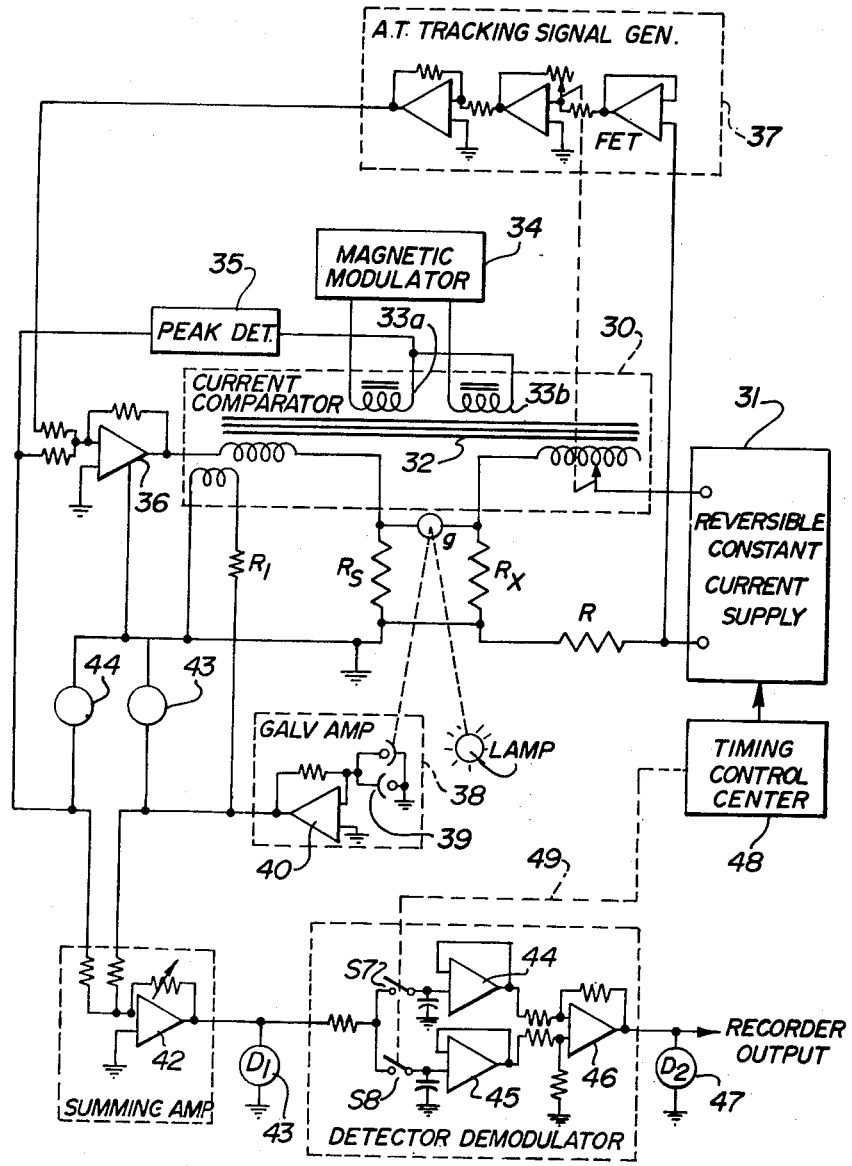

In drawings which illustrate embodiments of the invention,

FIG. 1 is a block diagram of a typical overall electrical measuring apparatus using the detector-demodulator of the present invention, FIG. 2 is a circuit diagram of the DC detector-demodulator, FIG. 3 is a waveform graph showing the timing sequence of the switches, FIG. 4 is a circuit diagram of the AC version of the device, FIGS. 5A and 5B are timing sequence graphs for the AC version, and FIG. 6 is a circuit diagram of a comparator bridge incorporating the DC detector-demodulator.

Referring to FIG. 1, a typical electrical measuring apparatus is shown in block form and consists of bridge 1, bridge supply modulator 2 fed from a suitable bridge supply, and a detector 3. The bridge may be an AC or DC type and it is standard practice to modulate (reverse) the bridge supply. The detector typically involves a null sensing device, e.g. a galvanometer with a meter or other readout device 4. As pointed out above, to eliminate or reduce the error in the readings caused by drifting thermal EMF's (low frequency noise), it would be highly advantageous to have rapid bridge reversal and a long time constant galvanometer. These two requirements are incompatible if accurate readings are to be achieved. If, however, the measuring system is modified by the addition of detector-demodulator 5 whose operation is timed and synchronized with that of the bridge supply modulator from timing circuit 6, then this incompatibility can be resolved. Detector-demodulator 5, whose operation will be described in more detail below, has incorporated in it a long time constant characteristic after the demodulation stage. This allows the system to operate with rapid bridge reversal and with short time constant characteristic null sensing device (galvanometer) in the detector.

Referring to FIG. 2, a DC detector-demodulator 11 has an input 10 that is a DC signal indicating unbalance or null of a bridge or circuit which is reversed periodically, e.g. by the reversal of the supply to a bridge. Demodulator 11 comprises switches S1 and S2, capacitors C1 and C2, resistors $R_A$ and $R_B$, amplifiers 12 and 13, and difference amplifier 14. The resistors and capacitors are chosen such that the circuit has a generally long time constant (decay time). It should be pointed out that the long time constant characteristic referred to here is required for averaging a signal that contains an AC ripple due to noise and this is done over a short sampling period. The switches may be mechanical switches or solid-state types, e.g. field effect transistors. The input is a reversing DC signal (waveform W of FIG. 3) having two levels A and B and regions of transients T. An example of such a signal is the output of circuit with a galvanometer as a balance detector. The galvanometer may be reversed although in practice it is more expedient to reverse the bridge itself by reversing the bridge power supply. The switches S1 and S2 are closed alternately by a signal from a timing control circuit, which also controls the reversal of the bridge power supply; the timing sequence is shown in FIG. 3. The switches are closed after the transients of waveform W have died down. This allows measurement of the steady state flat portions A and B of waveform W and eliminates the possible spurious effects of the switching transients T. When switches S1 or S2 are closed the output voltage from the DC detector is applied and stored in capacitors C1 and C2 which with amplifiers 12 and 13 are memory (sample and hold) devices. The voltage storage devices as such should have a very long storage time constant for maintaining the sampled voltage levels until such time as they are read and processed by the further circuitry and read-out devices. The voltages (A and B) are applied to difference amplifier 14 and an output is read on a suitable voltmeter or other read-out device 15. This output is effectively the amplitude difference between levels A and B and if the apparatus is being used in a bridge circuit, then this indicates the balance condition of the bridge.

The DC detector-demodulator described above is not sensitive to DC offsets or drifts, i.e. signals at the same frequency (zero) as the desired signal if the unwanted signals are not reversed when the bridge is reversed.

FIG. 4 shows a similar demodulator device but operating with AC signals. An input AC signal 16 which is a "null" signal that is periodically reversed in phase is applied to a phase-sensitive rectifier shown symbolically at 19 in the form of two switches P and Q operated by switching signal inputs 18 and 20. Phase sensitive rectifiers are conventional devices and accept an unbalance AC signal input and a reference signal of the same frequency and provide two outputs, one an in-phase DC output and the other a quadrature DC output. The outputs from the two switches P and Q are taken to an AC detector-demodulator 21 consisting of two circuits similar to that of FIG. 1. The operation of the circuit can be seen from FIGS. 5A and 5B which are graphs showing the AC waveforms. Curve A is the desired signal to be measured and B is a representative curve of an unwanted signal that it is desired to eliminate from the measurement. The switch or gate P is closed by a signal at 18 when the AC input to the bridge is one polarity and open at the other. The input 20 to switch or gate Q is also operated at the bridge frequency but shifted 90° in phase from the other switch. The outputs at P and Q are DC voltages (as seen in FIGS. 5A and 5B) with some modulation at $f$ or $2f$, where $f$ is the frequency of the AC supply to the bridge or circuit, for example 60 Hz or 400 Hz. The switches S3, S4, S5, and S6 are operated at the frequency of reversal of the bridge or measuring circuit, for example 1 Hz. Difference amplifiers 26 and 27 give the voltage difference which will be seen from the example of FIG. 4A to be $(A + B) - (-A + B) = 2A$ with signal B being completely suppressed. Meter 28 indicates the in-phase component of the null signal applied at input 16 and meter 29 indicates the quadrature component of the null signal at input 16. Both meters 28 and 29 do not indicate unwanted signals, e.g. noise or pickup which may be present at the AC supply frequency if these signals are not reversed at phase-sensitive rectifier 19. In other words the AC detector is not sensitive to spurious AC signals at the same frequency as the supply frequency if they are not also reversed when the bridge or circuit AC supply is reversed.

FIG. 6 shows an application of the invention to a current comparator bridge circuit. The principles of operation of this circuit are described in U.S. Pat. No. 3,490,038 issued Jan. 13, 1970 to the same applicants as the present invention. The comparator 30, made up of core 32, modulation-detection windings 33a and 33b energized by magnetic modulator 34, and ratio windings 33c and 33d are connected in bridge configuration with standard resistor $R_s$ and unknown resistor $R_x$ and energized by a constant current supply 31. A peak detector 35 acting as a null detector provides an output signal to amplifier 36 which produces a current through winding 33c of such value as to bring the comparator to the null flux condition. An ampere-turn tracking signal generator 37 whose output is proportional to the ampere-turns on the $R_x$ side of the bridge provides open loop control giving coarse balance by causing a current to flow in the reference ($R_s$) side to keep the net ampere-turns at approximately zero. Closed loop control is provided by the peak detector and modulator which tends to keep the net ampere-turn unbalance at zero (fine control).

A galvanometer g measures bridge balance and the galvanometer photo-cell amplifier 38 (photo-cells 39 and amplifier 40) is connected in common with the ampere-turn balance detector circuit. Feedback from the photo-cells to the galvanometer is not done in the usual manner, i.e., directly to the galvanometer but is done via the comparator. The output of the galvanometer amplifier is fed through resistor R1 to a winding $N_G$ to impose on the comparator ampere-turns proportional to the galvanometer deflection. The automatic balancing facility of the comparator results in a current being generated that flows through winding 33c and the reference resistor $R_s$ which in this configuration is now the feedback resistor of the galvanometer. This arrangement is preferable to the standard one where the indicating meter "common" must be connected to one of the galvanometer input terminals. In addition, this galvanometer has a generally short time constant characteristic and the bridge may be reversed rapidly. In the present case the output current of the photo-cells converted to a voltage and then amplified may be used to drive a meter which can be suitably grounded, e.g. meter 43.

Since the output of the galvanometer amplifier is fed into the comparator through a fixed resistor $R_1$ and a winding $N_a$ of a fixed number of turns, it can be expressed in units of volts/ampere-turn, the same as the output of the ampere-turn balance meter (meter 44). The two signals can then be summed in summing amplifier 42 to provide an output at detector 43 proportional to bridge balance and which is independent of out-of-balance signals which are common to both of these two inputs.

Although the bridge may be reversed manually by reversing the current supply, it is more convenient to reverse (modulate) the current automatically. A timing control center 48 provides a signal for reversing the constant current supply 31 and operates the switches S7 and S8 of the detector-demodulator 50 as shown by ganging line 49. The operation of the demodulator 50 is identical to that of FIG. 1 with the switching timing arranged as shown in FIG. 2.

What is claimed is:

1. A detector-demodulator for current, impedance, and voltage measuring devices of the type having a periodically reversed (modulated) output comprising:
   a. a null sensing device with a short time constant characteristic allowing rapid reversal,
   b. first and second signal channels each channel including signal storage means having a long time constant characteristic in relation to that of the said null sensing device,
   c. means for alternately applying the output of the said null sensing device to the first and second channels in a predetermined timing sequence related to the reversal timing of the measuring device, and
   d. means connected to the output of the first and second signal channels for measuring the relationship of the signal levels stored in the signal storage means and providing an output related to the relationship of these voltage levels.

2. A detector-demodulator as in claim 1 wherein the signal stored is a voltage and the storage means is an R-C circuit.

3. A detector-demodulator for current, voltage, and impedance measuring devices of the type having a modulated output that is reversed periodically comprising:
   a. a null sensing device with a short time constant characteristic allowing rapid reversal,
   b. first and second switches connected in parallel to the output of the said null sensing device,
   c. voltage storage means connected to each of the outputs of said switches, said means having a long time constant characteristic in relation to that of the said null sensing device,
   d. switch operating means for opening and closing said switches in a predetermined timing sequence, and
   e. means attached to the output of the voltage storing means for measuring the difference in the voltage levels stored in the voltage storage means and providing an output related to the difference of these voltage levels.

4. A detector-demodulator as in claim 3 wherein the switch operating means is synchronized with the reversal of the measuring device.

5. A detector-demodulator as in claim 3 in which the voltage storage means comprises a resistor, a capacitor and an amplifier.

6. A detector-demodulator as in claim 3 in which the difference measuring means is a difference amplifier.

7. A detector-demodulator for current and voltage measuring devices of the type using modulated AC signals that are reversed in phase periodically and a null sensing device having a short time constant characteristic allowing rapid reversal comprising:
   a. a phase sensitive detector connected to the output of the measuring device and providing two outputs, one an in-phase DC signal and the other a quadrature DC signal,
   b. first and second signal channels each channel including signal storage means having a long time constant characteristic in relation to that of the null sensing device,
   c. means for alternately applying the in-phase output of the phase sensitive detector to the first and second channels in a predetermined timing sequence related to the reversal timing of the measuring device,
   d. means connected to the output of the first and second signal channels for measuring the relationship of the signal levels stored in the signal storage means and providing an output related to the relationship of these voltage levels,
   e. third and fourth signal channels each channel including signal storage means having a long time constant characteristic in relation to that of the null sensing device,
   f. means for alternately applying the quadrature output of the phase sensitive detector to the third and fourth signal channels in a predetermined timing sequence related to the reversal timing of the measuring device, and
   g. means connected to the output of the third and fourth signal channels for measuring the relationship of the signal levels stored in the signal storage means in the third and fourth channels an providing an output related to the relationship of these voltage levels.

8. A detector-demodulator for current and voltage measuring devices of the type using modulated AC signals that are reversed in phase periodically and a null sensing device having a short time constant characteristic allowing rapid reversal comprising:
   a. first and second switches connected in parallel to the output of the measuring device to provide two outputs,
   b. switch means connected to said switches for operating said switches in a predetermined timing sequence such that the two outputs are an in-phase DC signal and a quadrature DC signal,
   c. third and fourth switches connected in parallel to the output of the first switch,
   d. first and second voltage storage means connected to the outputs of the third and fourth switches, said means having a long time constant characteristic in relation to that of the null sensing device,
   e. fifth and sixth switches connected in parallel to the output of the second switch,
   f. third and fourth voltage storage means connected to the outputs of the fifth and sixth switches, said means having a long time constant characteristic in relation to that of the null sensing device,
   g. switch operating means for opening and closing said third, fourth, fifth, and sixth switches in a predetermined timing sequence related to the reversal timing of the measuring device,
   h. means attached to the output of the first and second storage means for measuring the difference in the voltage levels stored in the first and second voltage storage means and providing an output related to the difference of these voltage levels, and
   i. means attached to the output of the third and fourth storage means for measuring the difference in the voltage levels stored in the third and fourth voltage storage means and providing an output related to the difference of these voltage levels.

* * * * *